United States Patent
Lu (10) Patent No.: US 6,480,911 B1
(45) Date of Patent: Nov. 12, 2002

(54) GROUPING CLASS SENSITIVE QUEUES

(75) Inventor: Xiaolin Lu, Middletown, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/404,290

(22) Filed: Sep. 23, 1999

(51) Int. Cl.[7] .................. G06F 3/00; G06F 15/173; H04L 12/54
(52) U.S. Cl. .................. 710/54; 370/429; 370/329; 709/240; 709/242; 710/52
(58) Field of Search .................. 370/329, 395, 370/399, 429; 710/52, 54, 56; 709/240, 227

(56) References Cited

U.S. PATENT DOCUMENTS

| | | | | |
|---|---|---|---|---|
| 5,923,656 A | * | 7/1999 | Duan et al. .................. | 370/395 |
| 5,974,467 A | * | 10/1999 | Haddock et al. ............ | 709/240 |
| 6,072,800 A | * | 6/2000 | Lee ............................. | 370/412 |
| 6,075,791 A | * | 6/2000 | Chiussi et al. ............... | 370/412 |
| 6,101,193 A | * | 8/2000 | Ohba .......................... | 370/429 |
| 6,205,150 B1 | * | 3/2001 | Ruszczyk .................... | 370/412 |
| 6,219,351 B1 | * | 4/2001 | Kilkki ........................ | 370/412 |
| 6,229,795 B1 | * | 5/2001 | Pankaj et al. ................ | 370/329 |
| 6,259,698 B1 | * | 7/2001 | Shin et al. ................... | 370/395 |
| 6,262,986 B1 | * | 7/2001 | Oba et al. .................... | 370/399 |
| 6,262,989 B1 | * | 7/2001 | Gemar et al. ................ | 370/412 |
| 6,295,295 B1 | * | 9/2001 | Wicklund ................... | 370/392 |
| 6,304,906 B1 | * | 10/2001 | Bhatti et al. ................ | 709/227 |
| 6,317,416 B1 | * | 11/2001 | Giroux et al. .............. | 370/232 |
| 6,330,223 B1 | * | 12/2001 | Shimonishi ................ | 370/230 |

FOREIGN PATENT DOCUMENTS

| | | | | |
|---|---|---|---|---|
| JP | 403101443 A | * | 4/1991 | |
| JP | 410191455 A | * | 7/1998 | |
| JP | 411032050 A | * | 2/1999 | |

* cited by examiner

*Primary Examiner*—Thomas Lee
*Assistant Examiner*—Chun Cao
(74) *Attorney, Agent, or Firm*—Oliff & Berridge, PLC (57) ABSTRACT

This invention provides a class queuing system where data is placed in queues distinguished by class. The class queuing system distinguishes one class from another based on desired characteristics of a host process such as a network process. The class queuing system groups the class queues into groups based on output ports, for example. Each of the groups is separated into logical or physical multiple levels that extend from an input to an output. Input data is queued in a lowest level queue and the data is moved from level to level until the data is placed in an output queue and transferred via a respective output port. Data movement between levels of the class queues is controlled by weight sets where the weights of the weight sets are determined based on the desired characteristics that distinguish the classes. In this way, classes having greater bandwidth, for example, are moved through the class queues at a faster rate than classes having lower bandwidth specifications.

12 Claims, 11 Drawing Sheets

GROUPING CLASS SENSITIVE QUEUES

BACKGROUND OF THE INVENTION

1. Field of Invention

This invention relates to methods and apparatus for class sensitive queuing.

2. Description of Related Art

Data transmitted in a network is often placed in a serial queue for routing and forwarding. The order that the data is queued is irrespective of the subscribers' subscription relationship with the network service provider. Thus, there are no provisions in the network routing and forwarding processes for making distinctions based on subscribers' subscription requirements. In fact, queuing techniques in general do not address subscription related issues. Accordingly, new technology is needed.

SUMMARY OF THE INVENTION

This invention provides a class queuing system where data is placed in queues distinguished by class. The class queuing system distinguishes one class from another based on desired characteristics of a host process such as a network process. For example, in a network environment, the desired characteristics may be expressed in network parameters such as transmission capacity (bandwidth), transmission throughput, end-to-end delay, quality of transmission or error rate, for example. Classes may be distinguished from each other by specifying minimum bounds of the above parameters so that data transmission for each of the classes may be guaranteed performance above the specified minimum bounds.

The class queuing system establishes groups of class queues which may be implemented using a single or multiple memories. Physical grouping of the class queues is not required because the complete class queuing system may be implemented via memory mapping, for example. However, for ease of visualization and discussion, related figures illustrate the group concept to show the functions of the invention.

Each of the groups corresponds to one output port that is coupled to a network link. A group is separated into multiple levels (logical or physical) that extend from input ports to output ports. Again, physical levels are not required but illustrated in the related figures for clarity only. Input data is first queued in a lowest level queue, and then the data is moved from level to level until the data is placed in an output queue for transmission or output via one of the output ports.

Data movement between levels of the class queues is controlled by a respective weight set where weights of the weight set are determined based on the desired characteristics that distinguish the classes. In this way, data of classes requiring greater bandwidth, for example, is moved through the class queues at a faster rate than data of classes having lower bandwidth requirements.

Each of the class queues may also be associated with buffer thresholds. The buffer thresholds specify a maximum size of a queue or a warning condition so that when an amount of data that is queued exceeds the buffer thresholds, either portions of the data may be dropped from the queue based on a data drop scheme or other queue management processes may be applied to adjust the queuing system. For example, the newest piece of data to be placed in the queue may be dropped or the weight set may be changed to account for the volume of data in the queue (e.g., by increasing queue throughput).

The class queuing system may use a weight based scheduling scheme to control transfer of data packets among queues. The weight sets may specify the data throughput for a queue during each cycle of the weight based scheduling so that appropriate transfer rates corresponding to the desired characteristics of each class may be achieved.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

This invention provides a class queuing system that processes data transmitted by a subscriber based on a class subscribed to by the subscriber. For example, in a network environment having high, medium, and low classes, each of the classes may be guaranteed a minimum bound relative to one or more network characteristics. The network characteristics may be qualities such as transmission capacity expressed in terms of bandwidth (bw), quality of service such as video display quality, multimedia capability, or end-to-end transmission delay, for example. Based on a specific selection of class specification parameters, the resulting bandwidth/line quality/error rate, etc. may be determined and applied as appropriate.

If network capacity serves as a class discriminator, a high capacity class may be guaranteed a bandwidth minimum bound of $bw_H$ so that data of high class subscribers may be transmitted through the network using a bandwidth of at least $bw_H$. Correspondingly, data of medium class subscribers may be guaranteed transmission at a bandwidth of at least a $bw_M$, and data of low class subscribers may be guaranteed data transmission at a bandwidth of at least $bw_L$. Maximum bounds of bandwidth may also be applied so that each class may be bounded by both maximum and minimum bounds. For ease of description, only minimum bounds are discussed.

The class queuing system may provide class independence, i.e., the volume of data in one class may be prevented from affecting the data transmission in other classes. For example, congestion in the low class may affect only low class throughput and quality. Medium and high class data transmissions may reach peak performances while low class data transmission may experience transmission degradation. However, if desired, the class queuing system may take advantage of lower traffic conditions in one of the class queues to assist data transmission of another more congested class.

The class queuing system may organize input queues into groups and a queue for each group may be separated into multiple levels (logical or physical). Data movement between queues at different levels of a group may be controlled based on weight sets.

For example, for high, medium and low classes, the input queue for any network unit, such as a router, may be grouped according to output ports (e.g., a physical network connection to another network unit) and organized into logical or physical multiple levels. The queues may progress from a lowest level queue that receives data from data input sources and ending in one output queue per output port.

A weight set may be assigned to queues at each level. The weight set regulates data movement from queues at one level to queues at a next level. In this way, data from different class subscribers may be controlled to partition a bandwidth of the output port to support the minimum bounds of the subscriber classes.

In the following discussion, the classifications of high, medium, and low capacities are used as an example and two weight sets of capacity and subscriber volumes are described for supporting the three classes. Other types and numbers of weight sets based on different network parameters or characteristics may also be used such as end-to-end delay, video quality, or error rate, for example.

Figure 1:
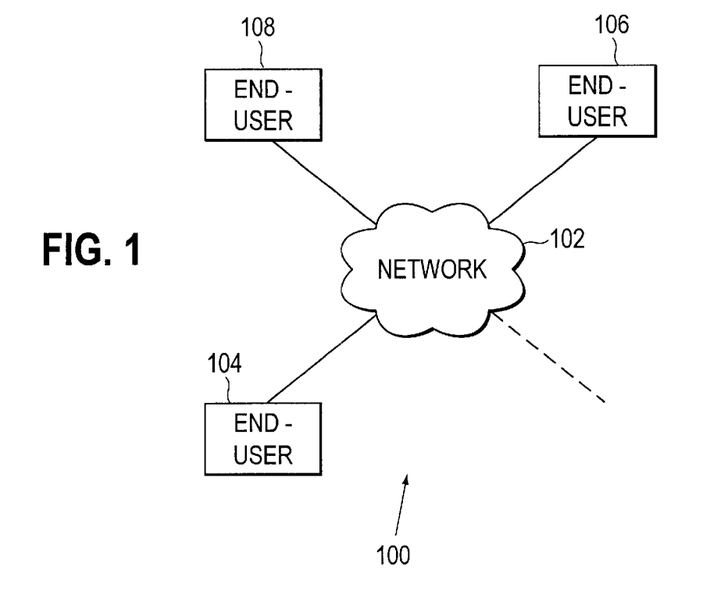
FIG. 1 is an exemplary diagram of a communication network.

FIG. 1 shows an exemplary diagram of a communications system 100 that includes a network 102 and end-users 104–108. The network 102 may be a telecommunication network, a data network or any of a variety of intra or internets that facilitates communication among end-users. The end-users 104–108 may be a terminal, a telephone station (wire or wireless) or other communication systems such as PBXs, for example.

When end-users 104–108 desire to communicate, each of the end-users 104–108 sends communication signals through the network 102 in the form of data packets, for example. Data packets are not required but are convenient for discussion purposes. Each of the data packets are received by the network 102 and placed into queues awaiting available network resources to complete the communication.

Figure 2:
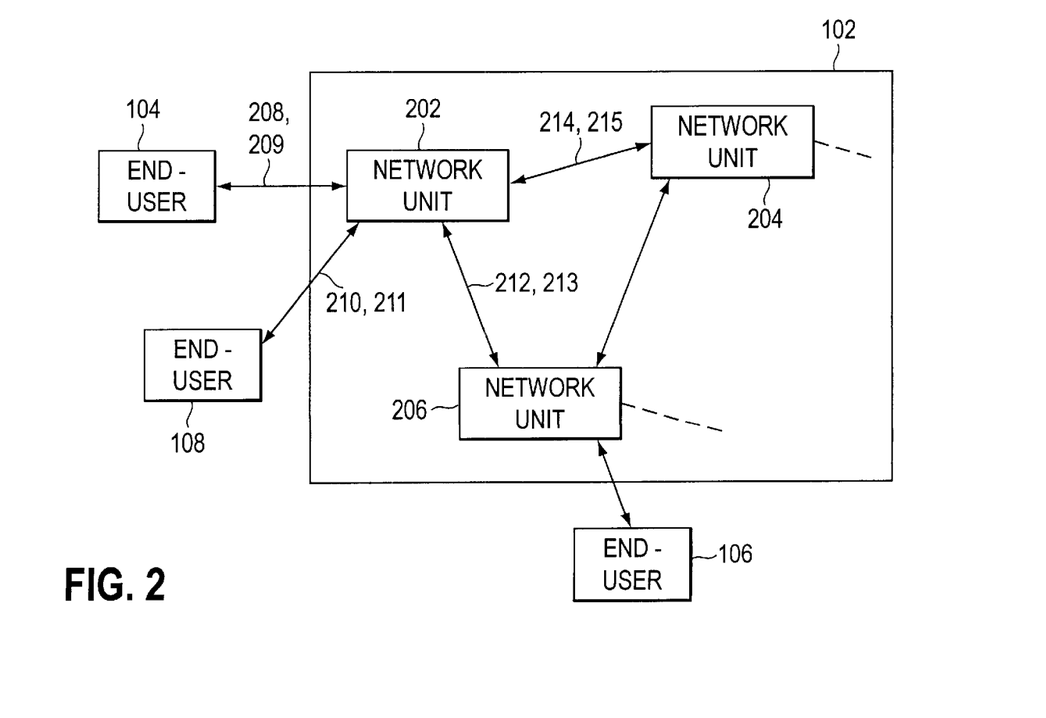
FIG. 2 is an exemplary diagram of the network in FIG. 1 with further detail.

FIG. 2 shows an exemplary diagram of the network 102 which includes network units 202–206. The network unit 202 is coupled to the end-user 104 via communication links 208 and 209; the end-user 108 via communication links 210 and 211; network unit 204 via communication link 214 and 215; and network unit 206 via communication links 212 and 213. The communication links 208, 210, 212 and 214 are input into the network unit 202, and the communication links 209, 211, 213 and 215 are output from the network unit 202. From the perspective of the network unit 202, data packets are received from the communication links 208, 210, 212 and 214 and each of the received data packets is destined to one of the end-users 104 and 108 and the network units 204 and 206.

Figure 3:
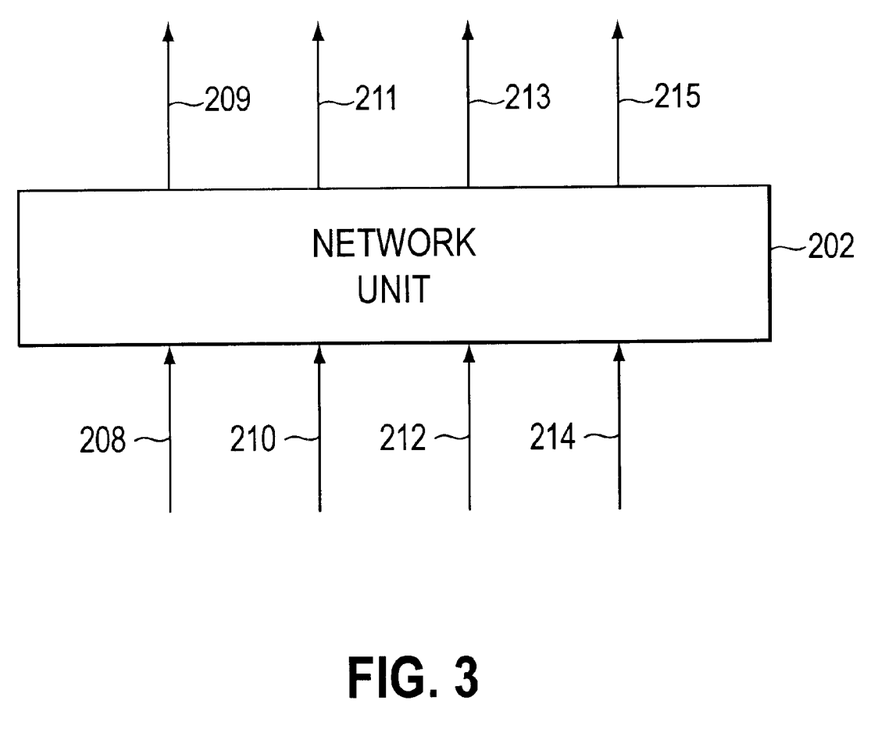
FIG. 3 is an exemplary block diagram of a network unit.

As an example, the network unit 202 is illustrated in FIG. 3, where the links 208, 210, 213 and 214 are input into the network unit 202, and the links 209, 211, 213 and 215 are output from the network unit 202. Data packets that are sent via the communication links 209, 211, 213 and 215 are destined for the end-users 104 and 108 and the network units 204 and 206, respectively.

The network unit 202 places data packets received from the links 208, 210, 212 and 214 into input queues so that a switch, for example, within the network unit 202 may route each of the data packets to the proper destinations corresponding to the links 209, 211, 213 and 215. Each of the links 209, 211, 213 and 215 are provided with output queues that receive the data packets from the input queues for outputting to the respective end-users 104 and 108 and the network units 204 and 206.

Figure 4:
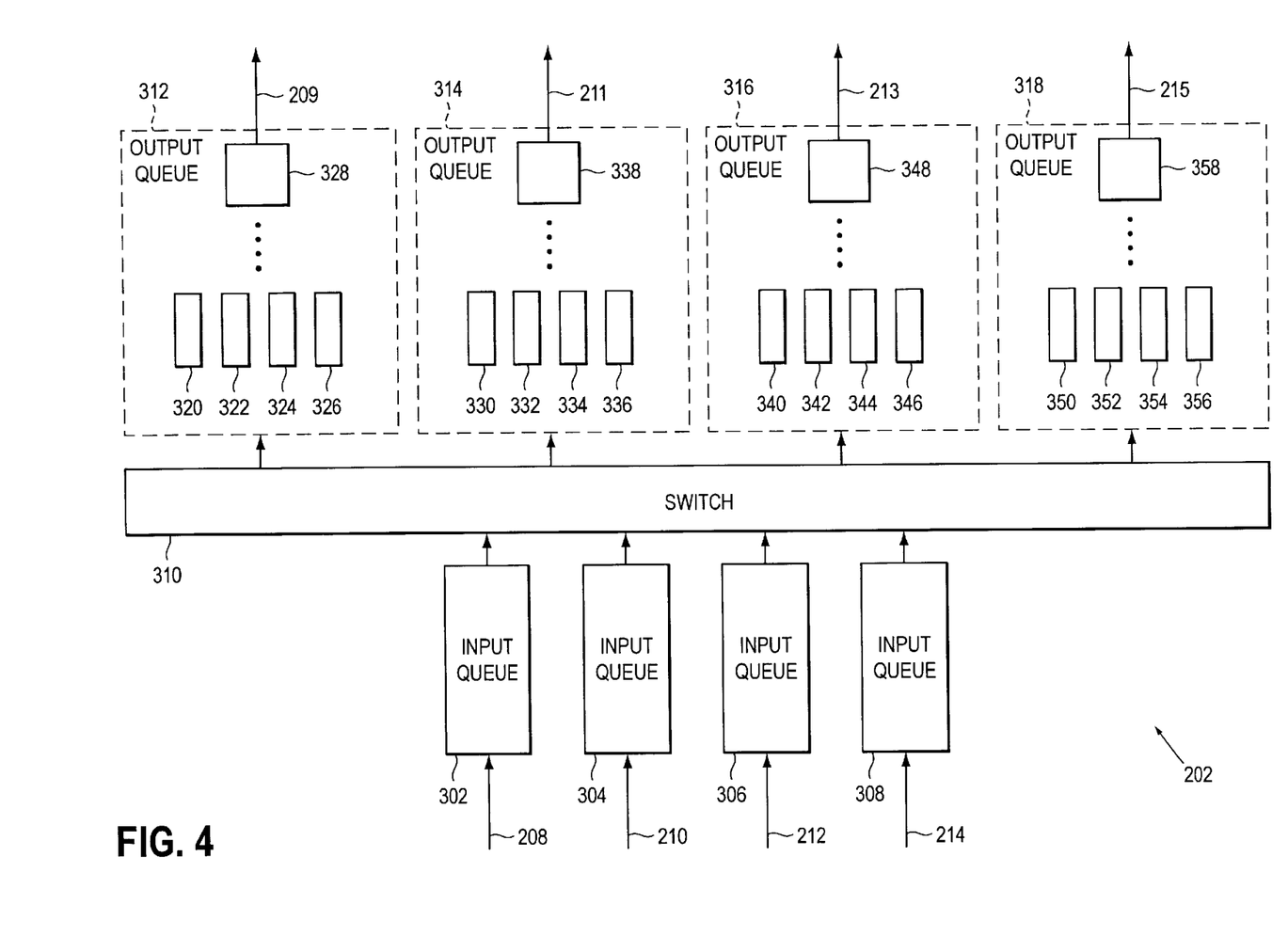
FIG. 4 is an exemplary queuing structure.

FIG. 4 shows an exemplary block diagram of the queues within the network unit 202. The input queues 302–308 receives data packets from the links 208, 210, 212 and 214. A switch 310 receives data packets from the input queues 302–308 and routes each of the data packets to one of output queues 312–318 corresponding to an appropriate destination of the data packet. While FIG. 4 shows the switch 310, there are many other known methods for routing the data packets from the input queues 302–308 to the output queues 312–318. For example, a bus may couple the input queues and the output queues together and a controller may simply read the data packets from the input queues 302–308 and write them into the output queues 312–318.

The class queuing system organizes each of the output queues 312–318 with destination input queues 320–356 and destination output queues 328–358. Each of the destination input queues 320–356 corresponds to one of the input queues 302–308. For example, the data packets that originated from the input queue 302 may be placed in one of the destination input queues 320, 330, 340 and 350; the data packets of the input queue 304 may be placed in one of the destination input queues 322, 332, 342 and 352; the data packets of the input queue 306 may be placed in one of the destination input queues 324, 334, 344 and 354; and the data packets of the input queue 308 may be placed in one of the destination input queues 326, 336, 346 and 356. The class queuing system moves the data packets in the destination input queues 320–326 to the destination output queues 328 based on network parameters such as the capacity for each class and the subscriber volume within each class.

Figure 5:
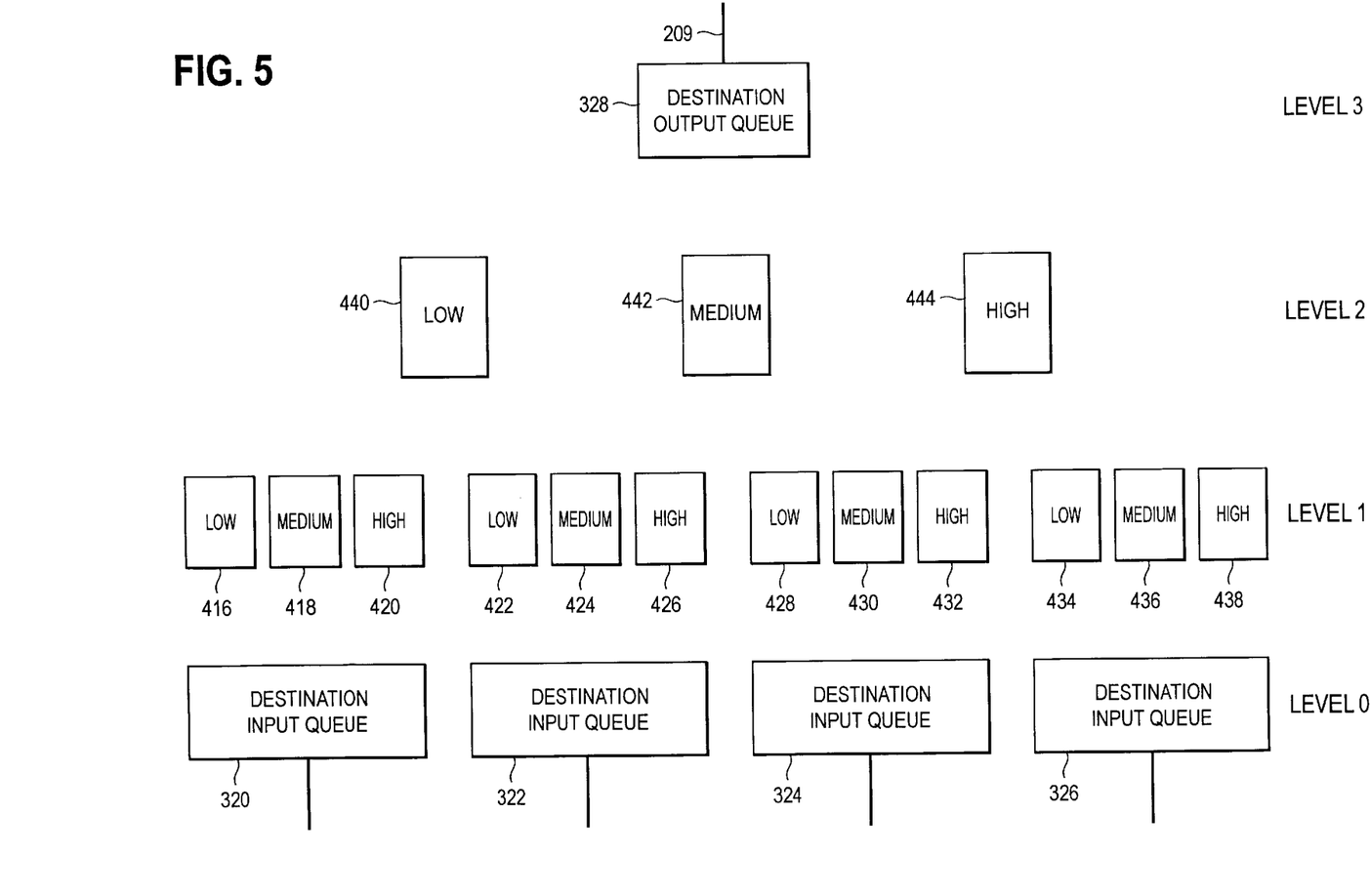
FIG. 5 is an exemplary queue organization.

FIG. 5 shows a more detailed exemplary diagram of the output queue 312 that supports high, medium and low classes. FIG. 5 illustrates functions that may be implemented in many ways such as memory mapping, application specific integrated circuits (ASICs), computer programs, etc. The destination input queues 320–326 form level zero queues; initial class queues 416–438 form level one queues; final class queues 440–444 form level two queues; and the destination output queue 328 forms a level three queue. The data packets within each of the destination input queues 320–326 may be organized into separate level one queues corresponding to each of the high, medium and low classes. The class queuing system moves data packets from the level one initial class queues 416–438 to the level two final class queues 440–444 based on a first weight set, and the data packets in the final class level two queues 440–444 into the destination output queue 328 based on a second weight set. The first and second weight sets may be determined using the capacity minimum bounds corresponding to each of the classes and the subscriber volumes of each of the classes, as described in detail below.

Capacity may be one of the parameters that determines either the first or the second weight set. For example, capacity may be defined in terms of a kilobits per second (KBPS) unit. Assuming that high capacity subscribers have a minimum bound bandwidth of 128 KBPS, medium capacity subscribers have a minimum bound bandwidth of 64 KBPS, and low capacity subscribers have a minimum bound bandwidth of 8 KBPS, then capacity weights for high, medium, and low capacity classes may be in a ratio of 128:64:8 or 16:8:1 when common factors are removed. Thus, the capacity weight for the high class is 16, for the medium class is 8 and for the low class is 1.

The subscriber volume of each of the classes may be another parameter for determining the value of the first and/or second weight sets. If the subscriber volume $n_H^T$ is the total high class data volume and the subscriber volume $n_H^i$ is the high class data volume that are currently being received at the ith destination input queue where i=1, 2, 3 and 4 for destination input queues 320, 322, 324 and 326, respectively, then a subscriber volume based weight for the high class may be $n_H^i/n_H^T$. Similarly, the medium and low class subscriber volume based weights may be $n_M^i/n_M^T$ and $n_L^i/n_L^T$, respectively. Data packets may be transferred between the level one initial class queues 416–438 to the level two final class queues 440–444 and between the level two final class queues 440–444 to the level three destination output queue 328 based on the above definition of capacity and subscriber volume based weight sets.

The subscriber volume may also be based on the number of subscribers of each class that are currently communicating. In this case, the subscriber volume $n_H^T$ is the total number of high class subscribers that are currently communicating via the network unit 102 and the subscriber volume $n_H^i$ is the total number of high class subscribers for the ith destination input queue. The subscriber volume may also be based on both the data volume and the number of subscribers for each class. For example, the subscriber volume may be the data volume divided by the number of subscribers for each class at a network unit 102 or for each of the destination input queues.

Figure 6:
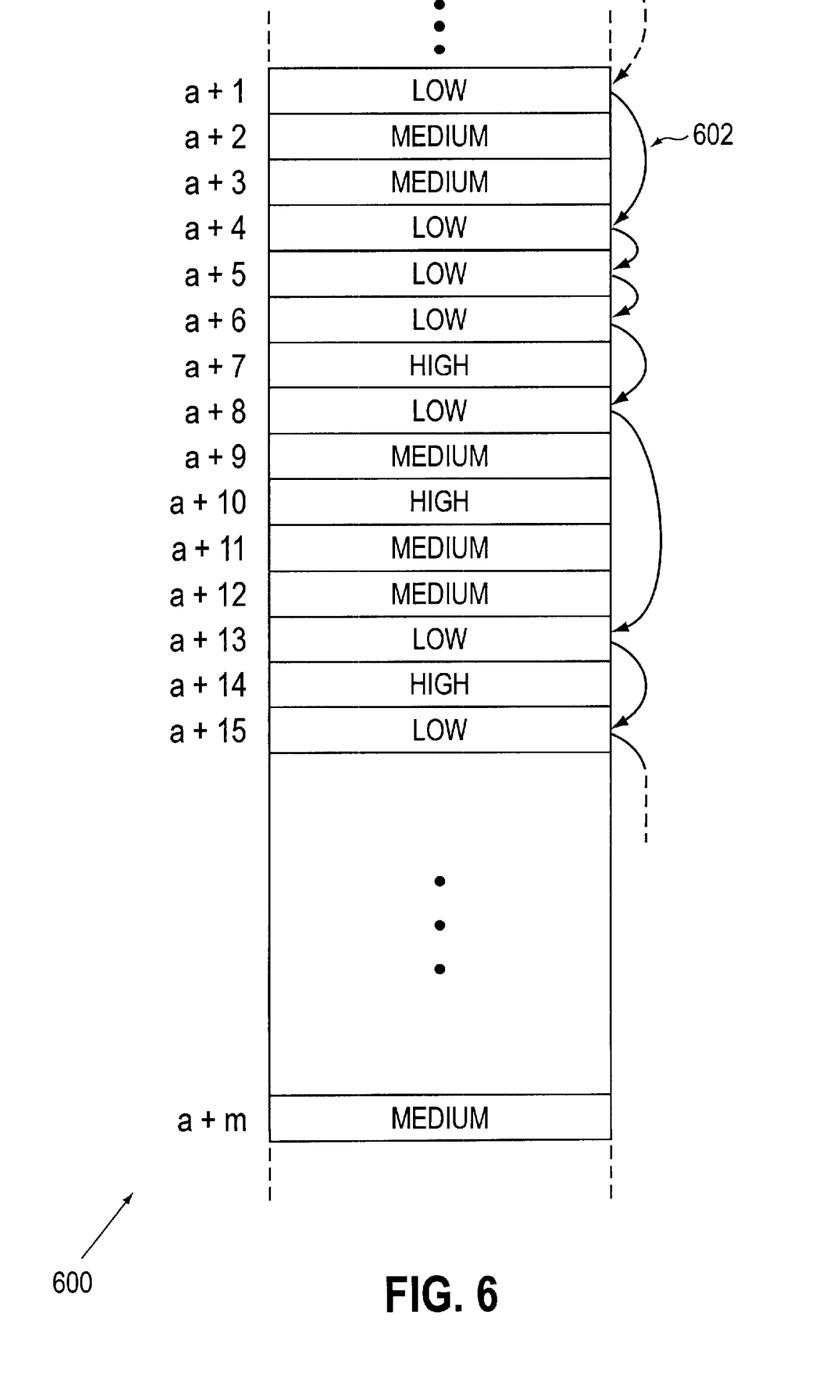
FIG. 6 is an example of a destination input queue.

The class queuing system may move data packets from the level 0 destination input queues 320–326 to the level 1 initial class queues 416–438 by simply linking data packets within each of the destination input queues 320–326 together in a chronological order (time of arrival) for each of the classes. FIG. 6 shows an example of a level 0 destination input queue 600 that has received data packets from all three high, medium and low classes, for example. The data packets at address a+1 was received before the data packet at address a+2. The data packets within the level 0 destination input queue 600 may be converted into level 1 initial class queues by linking data packets of respective classes together.

For example, all the data packets of the low class may be linked together by placing a parameter in a header portion of each of the low class data packets indicating where the next (in time) low class data packet may be found. Such linking is indicated in FIG. 6 by the set of arrows 602 which links the low class data packet at a+1 with the low class data packet at a+4 which in turn links to the low class data packet at a+5 and so on. If the medium and high class data packets are similarly linked, the destination input queue 600 would be separated into three initial class queues for high, medium and low classes.

Figure 7:
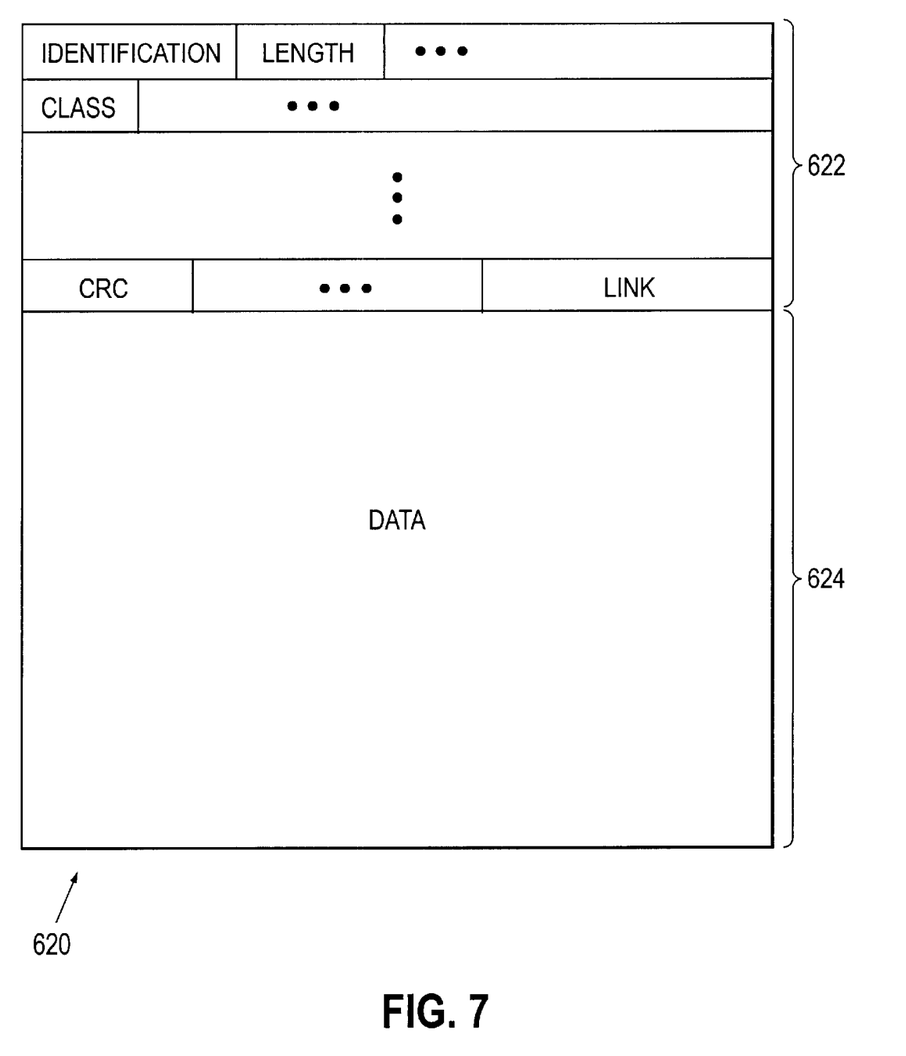
FIG. 7 is an exemplary diagram for a data packet.

FIG. 7 shows an example of a data packet 620 that includes a header portion 622 and a data portion 624. The header portion 622 may include information relating to control and identification of the data packet 620 such as an identification field, a length field, a class field, a cyclical redundancy code (CRC) field and a link field. The class field may indicate the class of the data packet 620 and the link field may indicate the address of the next data packet of the same class. Thus, the data packets are linked together in the order of arrival at each of the destination input queues 320–326.

Other methods may be used to move data packets from the level 0 destination input queues 320–326 to the level 1 initial class queues 416–438. For example, all the data packets of the same class may be transferred to a dedicated area in a memory specifically allocated for data packets of that class. Thus, the above example is provided for illustration purposes only and not intended to be limiting in any way.

Figure 8:
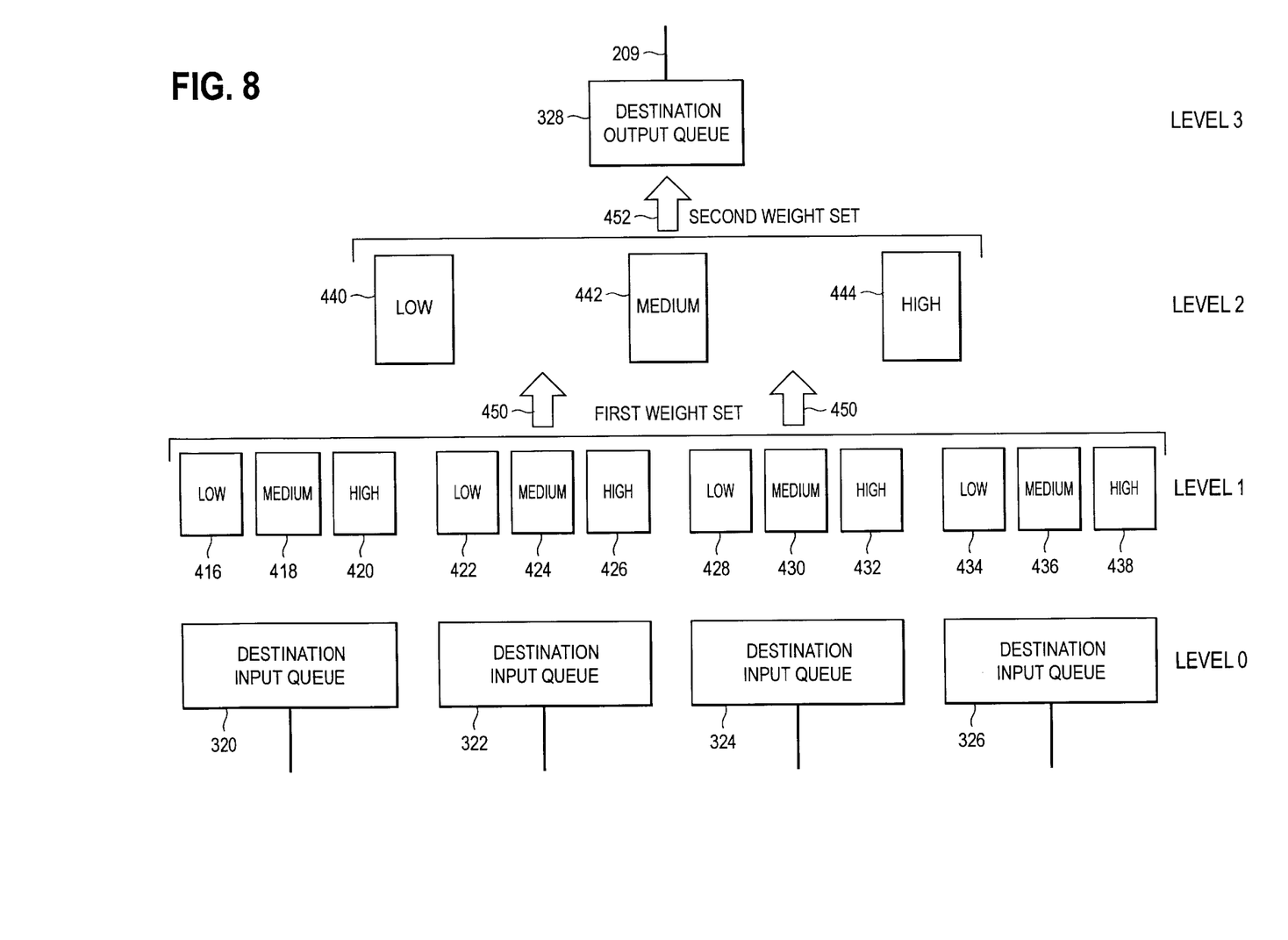
FIG. 8 is an exemplary diagram showing control of data movement by first and second weight sets.

FIG. 8 shows that data packets from the initial class queues 416–438 may be moved into the final class queues 440–444 based on the first weight set as indicated by arrow 450 and data packets from the final class queues 440–444 may be moved into the destination output queue 328 based on the second weight set as shown by arrow 452. Thus, the rate at which the data packets of each class move from the destination input queues 320–326 to the destination output queue 328 is based on a product of a weight of the first weight set times a weight of the second weight set.

The first and second weight sets may control a data packet transfer process based on a specific data packet transfer technique such as a weight based scheduling technique. In this technique, each weight set may specify how often data packets from a queue is transferred to a next level queue.

For a weight based scheduling scheme, head data packets from each of the initial class queues are transferred in sequence based on the weight set. A head data packet is a data packet that is waiting to be transferred ahead of all other data packets in a queue. After the head data packet is transferred, the next data packet (in time) in the queue becomes the head data packet and so on. In this way, the data packets in a queue is sequentially moved out of the queue.

A weight based scheduling scheme may operate in cycles where for each cycle a number of data packets is selected for transfer based on the weights of the weight set. For example, assume that the first weight set is 4, 3, 2, 1 corresponding to high class initial class queues 420, 426, 432 and 438 associated with destination input queues 320–326, respectively. Then four data packets from the initial class queue 420 is transferred to the high class final class queue 444 for three data packets from the initial class queue 426, two data packets from the initial class queue 432 and one data packet from the initial class queue 438.

If the second weight set is: high class=5; medium class=2; and low class=1, then five data packets from the high class final class queue 444 is transferred to the destination output queue 328 for two data packets of the medium class final class queue 442 and for one data packet of the low class final queue 440. The data packet transfers corresponding to the second weight set are illustrated in Table 1 below where columns are labeled with the final class queues 440–444 and the rows are labeled in the first column by cycles and the second column by class.

TABLE 1

|   |        | High 444 | Medium 442 | Low 440 |
|---|--------|----------|------------|---------|
| 1 | High   | 1–5      |            |         |
|   | Medium |          | 6–7        |         |
|   | Low    |          |            | 8       |
| 2 | High   | 9–13     |            |         |
|   | Medium |          | 14–15      |         |
|   | Low    |          |            | 16      |
| 3 | High   | 17–21    |            |         |
|   | Medium |          | 22–23      |         |
|   | Low    |          |            | 24      |
| 4 | High   | 25–29    |            |         |
|   | Medium |          | 30–31      |         |

TABLE 1-continued

|   | High 444 | Medium 442 | Low 440 |
|---|---|---|---|
| 5 | Low | | 32 |
|   |   | . |   |
|   |   | . |   |
|   |   | . |   |

For the first cycle, five data packets numbered 1–5 are transferred from the high class final class queue 444; two data packets 6 and 7 are transferred from the medium class final class queue 442; and one data packet 8 is transferred from the low class final class queue 440. Table 1 shows that the queues of each class is selected in a circular fashion, as an example. Other selection schemes are also possible such as transferring all the data packets from one of the queues for each cycle, selecting the queue having the largest number of data packets, or more complex techniques of transferring data packets oldest in time first.

In a second cycle, five data packets 9–13 are transferred from the high class final class queue 444; two data packets 14 and 15 are transferred from the medium class final class queue 442; and one data packet 16 is transferred from the low class final class queue 440. In cycle 3 another five data packets 17–21 are transferred from the high class final class queue 444; two data packets 22 and 23 are transferred from medium class final class queue 442; and one data packet 24 is transferred from the low class final class queue 440. Finally, in cycle 4, five data packets 25–26 are transferred from the high class final class queue 444; two data packets 30 and 31 are transferred from the medium class final class queue 442; and one data packet 32 is transferred from the low class final class queue 440.

As can be seen from Table 1, a number of data packets determined by the weight is transferred from a particular class queue in a circular manner for each cycle. In this way, the weights control the rate at which data packets are moved through each of the queues 444–440. Data is transferred through the high, medium and low class queues 420, 426, 432, 438; 418, 424, 430, 436; and 416, 422, 428, 434 independently of other class queues. Thus, congestion occurring in one of the class queues does not affect the throughput in other class queues.

A similar process, as described above, may be applied to data packet transfers between queues of adjacent levels. The differences between the data packet transfers between level 1 and level 2 queues and between the level 2 and level 3 queues are the weight sets, the number of queues and the grouping of the queues. For example, data packets of four level 1 initial class queues 416–438 are transferred to one of the level 2 final class queues 440–444. The data packets of the three level 2 final class queues 440–444 are transferred to the single level 3 destination output queue 328.

The class queuing system may set buffer thresholds for any of the class queues 320–328 and 416–444. A buffer threshold is a maximum number of data packets that may be stored in a queue before an action is taken. For example, if a hard buffer threshold is exceeded (e.g., the maximum physical memory size), then data packets are dropped or deleted. For example, if a hard buffer threshold for the high class final class queue 444 is set at 2,000 data packets, then, when the 2001th data packet transfer is attempted, one data packet of the 2001 data packets is dropped.

Complex schemes for dropping data packets may be implemented to maintain a minimum bound quality of communication. For example, if the data packets represent digitized voice, it may be advantageous to drop data packets that are evenly spread across time. In such a case, when transferring a data packet that caused the total number of data packets of a queue to exceed the hard buffer threshold, a voice data packet of the same communication already stored in the final class queue may be dropped. However, such schemes may be too complex because it may be difficult to determine the relationship among data packets relative to a specific communication among parties, for example. Thus, if data packets arrive at a particular network unit 202–206 in a random manner, dropping either the latest transfer data packet or the head data packet may be the simplest procedure.

Data packet dropping may be an indication that network resources need to be increased. The number of data packets dropped, the time at which data packet dropping occurs and the location where data packet dropping occurs may be flagged as data dropping occurs and later collected. By analyzing the above types of collected data, network improvements and expansion may be made to achieve high quality of service in a controlled manner with high efficiency and low cost.

A soft buffer threshold is a buffer threshold that is less than a hard buffer threshold. When soft buffer thresholds are exceeded, the class queuing system is alerted to take some recovery action such as changing the weights to realign data throughput to adapt to current subscriber volume conditions of the different classes.

As discussed above, a set of capacity weights may be related to a minimum bound bandwidth assigned to each class. For the example, the weight set may be 16:8:1 corresponding to the high, medium and low classes. Weights that are determined based on subscriber volume (data volume/number of subscribers/combination of data volume and number of subscribers) are called subscriber weights and may be set based on current subscriber volume of a particular destination input queue 320–326 $n^i$ divided by a total current subscriber volume of a particular class $n^T$. For example, the subscriber weight for high class subscribers may be expressed as $n_H^i/n_H^T$. Thus, the subscriber weights dynamically tracks the current usage or congestion of the network. Depending on how the first and second weight sets and the buffer thresholds are determined, all of these parameters may be adapted to a specific congestion condition.

Three examples for setting the first and second weight sets and the buffer thresholds are listed in Table 2 and described below.

TABLE 2

|   | First weight set | Second weight set | Threshold |
|---|---|---|---|
| Example 1 | Subscriber weight | Capacity weight | 1/Capacity weight: hard threshold |
| Example 2 | All weights = 1 | Capacity weight | 1/Subscriber weight: soft threshold |
| Example 3 | All weights = 1 | Subscriber weight (normalized) | 1/Capacity weight: hard threshold |

Example 1 illustrates a class queuing where no interference occurs between queues of different classes. In Example 1, the first weight set is determined based on the subscriber weight, the second weight set is determined based on the capacity weight and the buffer threshold is a hard buffer threshold that is inversely proportional to the capacity weight. Intuitively, the first and second weights control the rate at which data packets for each of the classes pass through the initial and final class queues 416–438 and 440–444, respectively, to the destination output queue 328. The larger the weight, the faster the data packets are moved through the initial and final class queues 416–438 and 440–444, respectively. Thus, high class data packets have a higher throughput rate because high class data packets have high capacity weight values while medium class data packets have lower capacity weight values. Accordingly, the capacity weight values control the rate at which data packets of each class moves through the initial and final class queues 416–438 and 440–444, respectively.

The buffer thresholds for each of the final class queues 440–444 set a maximum number of data packets beyond which some action is taken. For hard buffer thresholds, data packets will be dropped. For Example 1, the hard buffer threshold is set to be inversely proportional to the capacity weight. The proportionality constant is determined based on overall network conditions to guarantee the minimum bound bandwidth requirements. As discussed earlier, various schemes may be applied for dropping data packets to maintain communication quality where possible.

Example 2 of Table 2 sets the first weight set to all 1's so that data packets for all the classes for all the input ports are transferred from the initial class queues 416–438 to the final class queues 440–444 at the same rate. For this example, the rate at which data packets are transferred through the initial and final class queues 416–438 and 440–444, respectively, are based on the capacity weight set only and the class queuing system responds to the current traffic condition by adjusting the buffer thresholds. The buffer threshold is a soft buffer threshold and is determined by the subscriber weight.

If the number of data packets exceeds the soft buffer threshold, the class queuing system may change the first weight set from all 1s to values based on the current data volume in all the classes, the minimum bound bandwidths, etc. In this way, data dropping may be avoided without compromising on the minimum bound bandwidths.

The capacity weight values may be predetermined during subscription time and do not adapt to a specific congestion condition during operation of the network 102. During operation, soft buffer thresholds may be used to detect actual capacity needs so that the minimum bound bandwidth requirements are not violated. For extreme conditions, the capacity weight values may be adjusted to change minimum bound bandwidths. This condition may be flagged as an indication that additional resources is needed to avoid future occurrences of such overload conditions.

As an example, assume that on the average for any moment in time, only 30% of the high class bandwidth is required to achieve high class minimum bound bandwidth condition, network resources may be installed to support only 40% (10% margin) of high class data packet volume. Thus, the number of high class data packets actually transmitted during any specific time may temporarily overwhelm the high class initial and final class queues 416–438 and 440–444, respectively. During such a network condition, the throughput of the high class initial and final class queues 416–438 and 440–444, respectively, may be increased to satisfy the minimum bound bandwidth boundary condition. This increase may be achieved by adjusting the first weight set so that the rate at which data packets pass through the initial and final class queues 416–438 and 440–444, respectively, are adaptively adjusted to the number of data packets actually being transmitted through the network 102.

The above adjustment may be made without compromising minimum bounds of other classes. For example, assume that, in a current data packet volume condition, much more data packet volume is being experienced by the high class compared to the minimum high class bandwidth than by the medium class compared to the minimum medium class bandwidth. In this situation, the actual bandwidth required to meet the minimum medium class bandwidth may be reduced and the "spare" bandwidth may be used to transmit the high class data packets.

In this way, bandwidth may be traded between classes to avoid data dropping and still meet minimum bounds of all classes. Thus, the weights may be adjusted to maintain (guarantee) minimum bound bandwidth as discussed above. The weight may also be adjusted to change the minimum bound bandwidths (violate guarantee) to accommodate changes in circumstances such as to allow upgrade of resources to provide increased overall capacity.

In Example 3, the capacity weight is used to set the buffer threshold and normalized subscriber weights are used to set the second weight set. The normalized subscriber weights may be defined as follows:

Low class weight=$[n_L^T/(n_H^T+n_M^T+n_L^T)]\times$Normalization factor; (1)

Medium class weight=$[n_M^T/(n_M^T+n_L^T)]\times$Normalization factor; and (2)

High class weight=Normalization factor, where (3)

Normalization factor=$[n_H^T/(n_H^T+n_M^T+n_L^T)]+[n_M^i/(n_H^T+n_M^T)]+[n_H^i/n_H^T]$ (4)

As expressed by the above equations, Example 3 favors higher class subscribers. For example, the weights are adjusted so that the high class throughput through the initial and final class queues 416–438 and 440–444, respectively, is less affected by the subscriber volumes in the medium and low classes and the medium class throughput is less affected by the subscriber volume in the low class. Thus, Example 3 is adaptive to the total number of subscribers but favors the higher class subscribers. Also, during congestion, data packet dropping may begin with the low class when the total network capacity is exceeded. Thus, high class communications quality is also protected.

The buffer threshold for Example 3 is inversely proportional to the capacity weight alone. Thus, the minimum bound bandwidth are controlled mainly through the second weight set based on the subscriber volume during any period of time.

The buffer threshold for Example 3 is a hard threshold. However, a soft threshold may be generated based on network parameters such as transmission throughput, end-to-end delay, quality of transmission, error rate, etc. If the number of data packets exceed the soft buffer threshold, then the weights may be adjusted to ensure minimum bounds.

The above description provides explicit examples of network parameters that set the first and second weight sets and associated buffer thresholds (both hard and soft). However, the weights sets may be determined based on other network parameters depending on specific network design and implementation details. For example, quality of service parameters such as end-to-end delay, transmission error rate, etc. may also be used.

Figure 9:
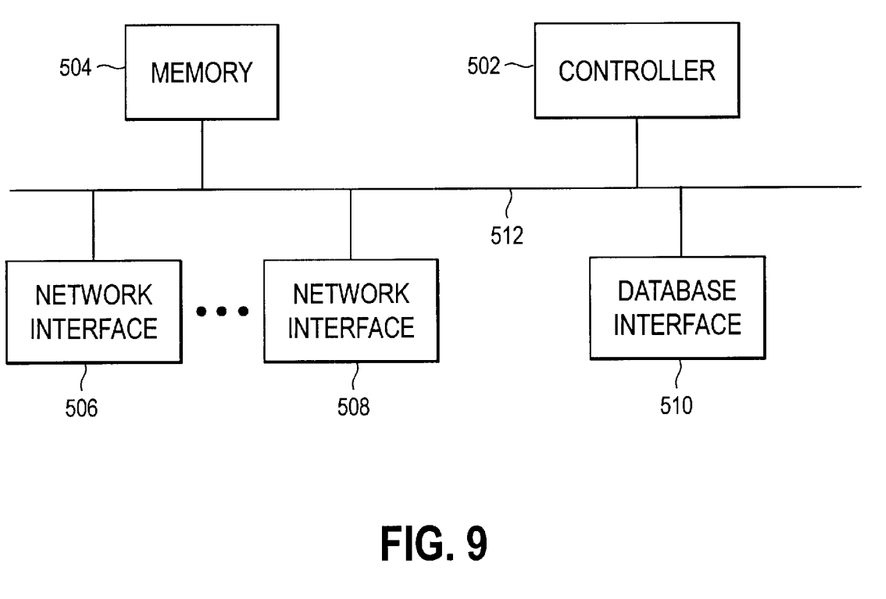
FIG. 9 is an exemplary block diagram of a queue processor of the network unit that performs queue processing.

FIG. 9 shows an exemplary block diagram of a queue processor of the network unit 202 that performs the processes that support the class queuing system. The network unit 202 is used as an example for all the network units 202–206. The queue processor includes a controller 502, a memory 504, network interfaces 506–508 and a data interface 510. The above components are coupled together via signal bus 512.

Data packets are first received from the various network devices such as end-users 104 and 108 and the network units 204 and 206 via the network interfaces 506 and 508. When data packets arrive, each of the data packets are placed into destination input queues 320–326 as shown in FIG. 8, for example. The controller 502 organizes the data packets in the destination input queues 320–326 into initial class queues 416–438 via various methods such as linking data packets of the same class together as shown in FIG. 6.

While performing the linking task, the controller 502 may also collect subscriber volume data so that the actual number of subscribers that are communicating and data packet volume for any period of time for each class may be determined. When appropriate, the controller 502 processes the subscriber volume data and generates first and second weight sets and respective buffer thresholds for controlling the class queuing system.

The queue processor may move data packets from one queue level to the next by performing the weight based scheduling scheme as described above, for example. Thus, the controller may select one class queue at some level and determine whether a head packet may be transferred from the class queue to a next level class queue. If a head data packet does not exist (queue empty), the controller 502 may go to another queue of the same class and level to check whether a head data packet exists for that queue. If none of the queues in the same class and level have head packets, then the controller 502 may select queues of another class but of the same level in the weight based scheduling order.

If a head data packet is found, the controller 502 moves the head data packet from the lower level queue into the respective next level queue if the next level queue is not full (i.e., the number of data packets in that queue does not exceed the buffer threshold). If the next level queue is full, the controller 502 either begins a data packet dropping process already discussed or readjusts the weights if a soft buffer threshold is exceeded. If the next level queue is not full, the head data packet is moved into the next level queue and the controller 502 moves on to transfer the head data packet of another lower level queue as determined by the weight based scheduling scheme.

If a data packet is to be dropped, the controller 502 may set a flag to request an update of the weights and buffer thresholds to better conform to current congestion conditions. Also, another flag may be set to indicate an overload condition and that more network capacity need to be installed to prevent future network congestion conditions.

The queues 302–318 may be stored either in the memory 504 or in a database accessible to the database interface 510. The controller 502 may move the data packets received from the network interfaces 506–508 into either the memory 504 or the database via the database interface 510 as the class queuing system requires.

Figure 10:
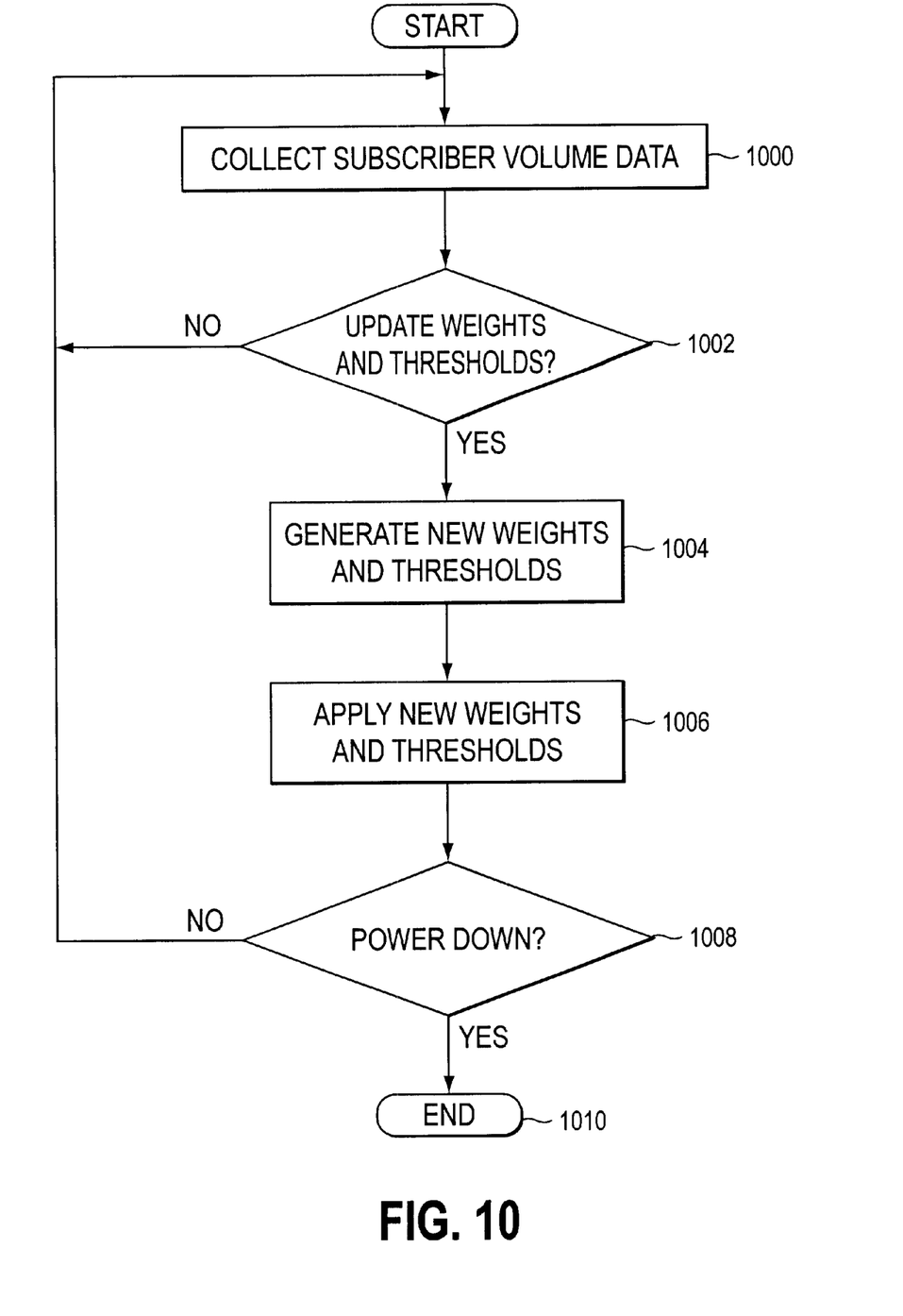
FIG. 10 is an exemplary flowchart for a subscriber volume collection process of the queue processor.

FIG. 10 shows a flowchart of an exemplary subscriber volume data collection and weight update process. In step 1000, the controller 502 collects subscriber volume data as data packets arrive at the destination input queues 320–326 and goes to step 1002. In step 1002, the controller 502 determines whether it is time to update weights and buffer thresholds. Such determination may be made based on various flags and conditions being set by other processes which requests an update, or the update process may be scheduled on a periodic basis. If update of the weights and buffer thresholds are to be performed, the controller 502 goes to step 1004, otherwise, the controller 502 returns to step 1000.

In step 1004, the controller 502 generates new weights and buffer thresholds and goes to step 1006. In step 1006, the controller 502 applies the new weights and buffer thresholds to the and goes to step 1008. In step 1008, the controller 502 determines whether the network unit 202–206 is to be powered down. If a power-down condition is detected, the controller 502 goes to step 1010 and ends the process; otherwise, the controller 502 returns to step 1000 and continues the process.

Figure 11:
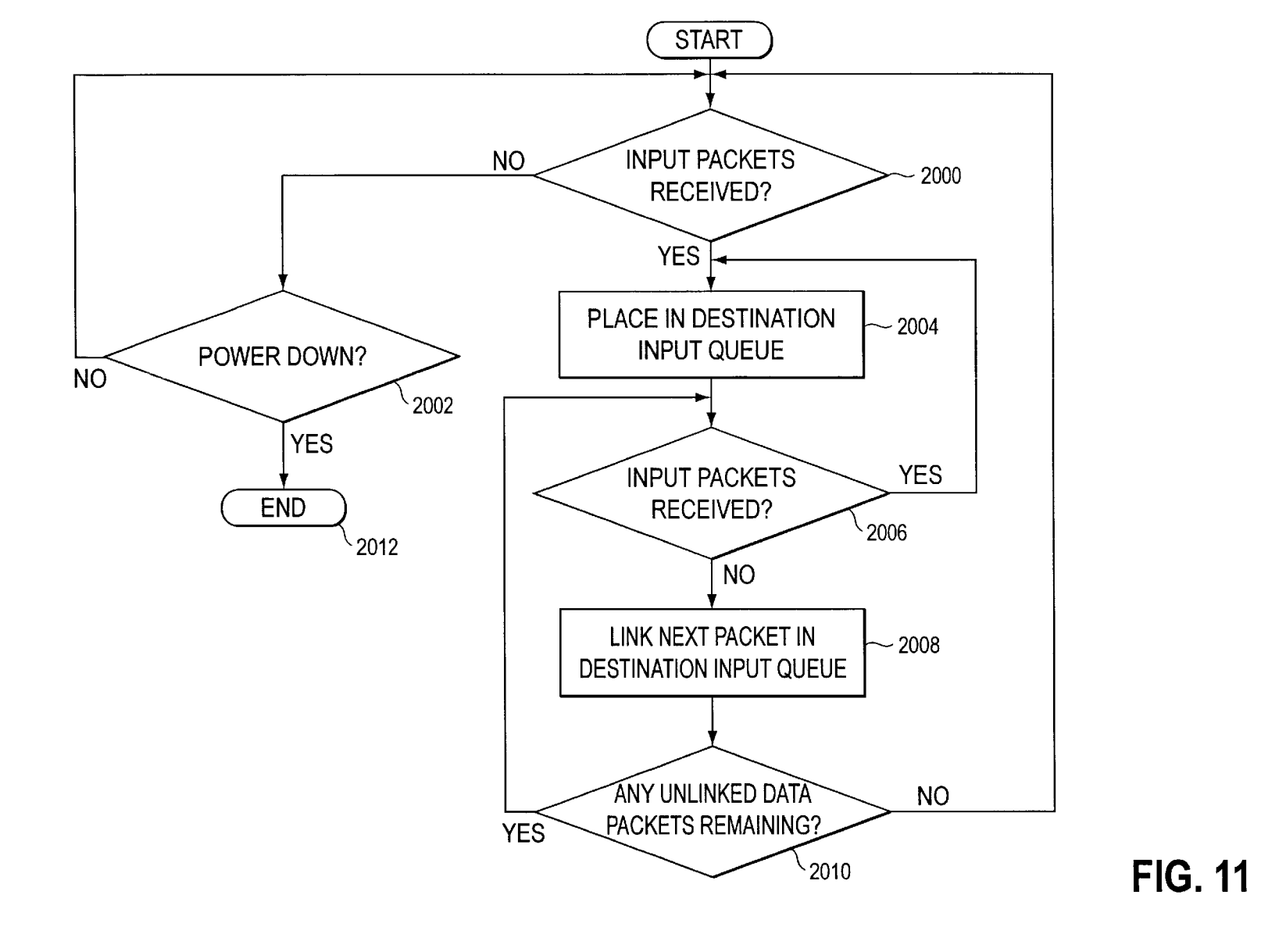
FIG. 11 shows an exemplary flowchart for a destination input queue process of the queue processor.

FIG. 11 is an exemplary queue processor process for receiving data packets into the destination input queues 320–326 and linking the data packets into its respective classes. In step 2000, the controller 502 determines whether input packets have been received. If input packets have been received, the controller 502 goes to step 2004; otherwise, the controller 502 goes to step 2002. In step 2002, the controller 502 determines whether a power-down condition has occurred. If a power-down condition has occurred, the controller 502 goes to step 2012 and ends the process; otherwise, the controller 502 returns to step 2000.

In step 2004, the controller 502 places the input packets into the destination input queue 320–326 and goes to step 2006. In step 2006, the controller 502 determines whether additional input packets have been received. If received, the controller 502 returns to step 2004 and places the newly received data packets into the destination input queues 320–326; otherwise, the controller 502 goes to step 2008. In step 2008, the controller 502 links the next unlinked data packet in each of the destination input queues with a last linked data packet of the same class. For example, if the next unlinked data packet in the destination input queues 320–326 is a low class data packet, the controller 502 links the next data packet with the last linked low class data packet so that an initial class queue may be formed. Then, the controller 502 goes to step 2010. In step 2010, the controller 502 determines whether there are any unlinked data packets remaining in the destination input queue 320–326. If no unlinked data packets remain, the controller 502 returns to step 2000; otherwise, the controller 502 returns to step 2006.

Figure 12:
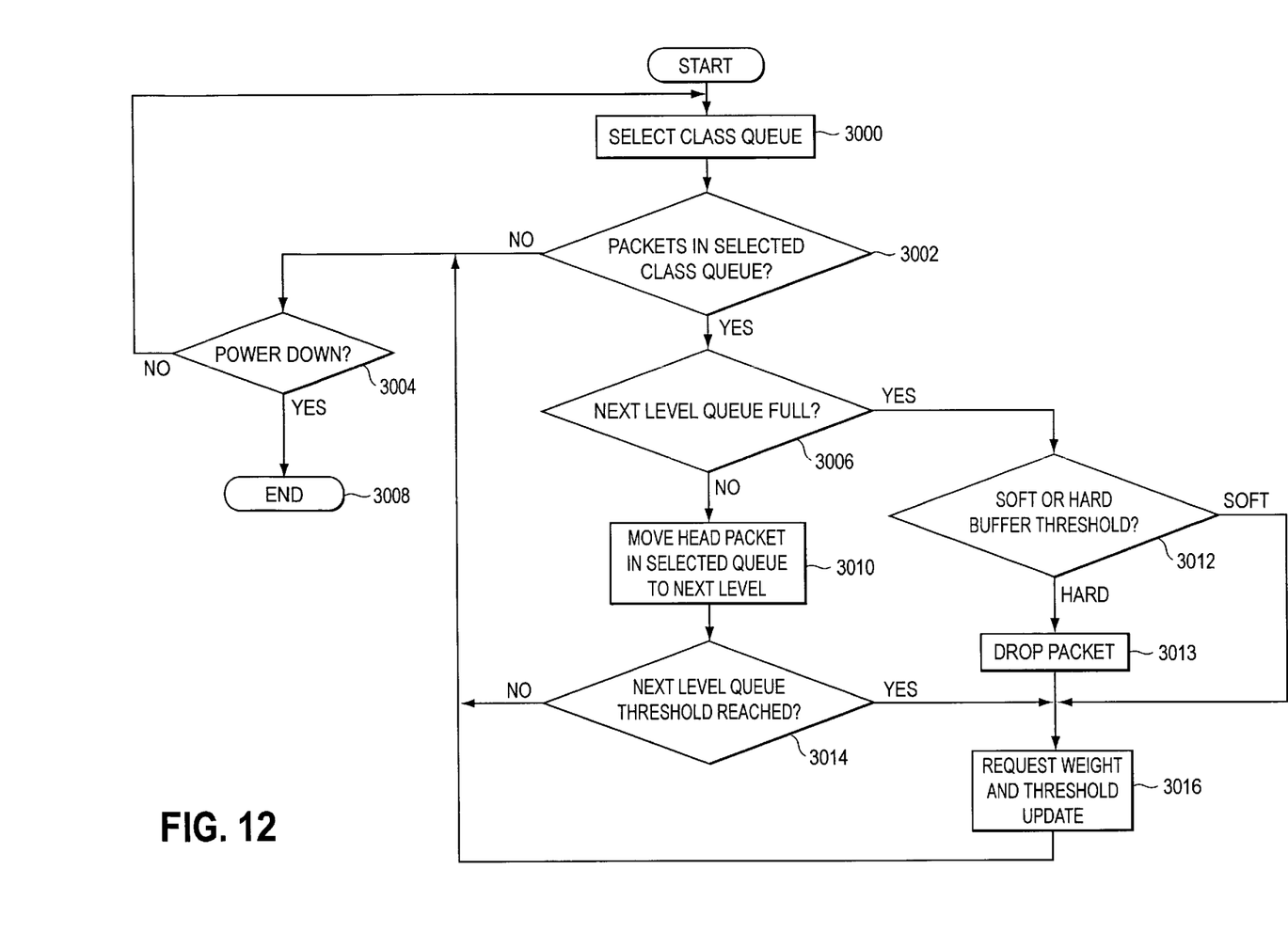
FIG. 12 is an exemplary flowchart for class queue process of the queue processor.

FIG. 12 shows an exemplary process for the queue processor to move data packets from one level of the class queues to a next level of class queues. In step 3000, the controller 502 selects one of the lower level class queues based on the weight based scheduling scheme, for example, and goes to step 3002. In step 3002, the controller 502 determines whether there are data packets to be transferred in the selected queue. If there are data packets, the controller 502 goes to step 3006; otherwise the controller 502 goes to step 3004. In step 3004, the controller 502 determines whether a power-down condition exists. If a power-down condition exists, the controller 502 goes to step 3008 and ends the process; otherwise, the controller 502 returns to step 3000.

In step 3006, the controller 502 determines whether the next level queue is full (reached either a soft or hard buffer threshold). If the next level queue is full, the controller 502 goes to step 3012; otherwise, the controller 502 goes to step 3010. In step 3012, the controller 502 determines whether the buffer threshold is a soft or hard threshold. If a hard threshold, the controller 502 goes to step 3013; otherwise, the controller 502 goes to step 3016. In step 3013, the controller 502 drops a data packet which may be already stored in the next level queue, drops the new data packet read from the lower level queue or drops the head packet in the next level queue. The dropping of data packets may be based on a more complex scheme to maintain quality of communications.

After dropping the data packet in step 3013, the controller 502 goes to step 3016. In step 3016, the controller 502 requests weight and buffer threshold update and goes to step 3004. In step 3010, the controller 502 moves the head packet in the selected queue to the next level queue and goes to step 3014. In step 3014, the controller 502 determines whether the next level queue threshold has been reached. If reached, the controller 502 goes to step 3016; otherwise, the controller 502 goes to step 3004.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A queue management method, comprising:

establishing a plurality of class queues;

placing queued data in the class queues according to a plurality of classes, each of the queued data being placed in one of the class queues based on a class of the queued data;

grouping the class queues into groups based on a number of output ports of an output, each group of the groups corresponding to one of the output ports; and separating class queues of each group into a plurality of levels of queues between an input and the output.

2. The method of claim 1, wherein a first number of queues receiving data from the input is an integer multiple of a second number of input ports of the input, the integer multiple being a third number of classes of the queued data.

3. The method of claim 1, further comprising:

assigning to each level of the levels a corresponding weight set of the weight sets, the corresponding weight set setting an output priority for corresponding queues of each level; and assigning at least one buffer threshold to each queue of the class queues in each group, the buffer threshold specifying when each queue is full.

4. The method of claim 3, further comprising:

reducing a first number of queues in each successive level of queues extending from a second number of input queues starting at the input down to one output queue at the output; and setting a third number of queues in each level other than the output queue, the third number being a multiple of a number of classes.

5. The method of claim 4, wherein a number of weights for each corresponding weight set of each level corresponds to the third number of queues.

6. The method of claim 3, wherein a data unit for a queue is dropped if a number of data units exceeds the buffer threshold for the queue, a dropped data unit may be a data unit already queued in the queue or a data unit to be queued in the queue.

7. A queue management apparatus, comprising:

a memory for storing queued data; and a controller coupled to the memory, the controller establishing a plurality of class queues in the memory, placing queued data in the class queues according to a plurality of classes, each of the queued data being placed in one of the class queues based on a class of the queued data grouping the class queues into groups based on a number of output ports of an output, each group of the groups corresponding to one of the output ports, and separating class queues of each group into a plurality of levels of queues between an input and the output.

8. The apparatus of claim 7, wherein a first number of queues receiving data from the input is an integer multiple of a second number of input ports of the input, the integer multiple being a third number of classes of the queued data.

9. The apparatus of claim 7, wherein the controller assigns to each level of the levels a corresponding weight set of the weight sets, the corresponding weight set setting an output priority for corresponding queues of each level, and assigns a buffer threshold to each queue of the class queues in each group, the buffer threshold specifying when each queue is full.

10. The apparatus method of claim 9, wherein the controller reduces a first number of queues in each successive level of queues extending from a second number of input queues starting at the input down to one output queue at the output, and sets a third number of queues in each level other than the output queue, the third number being a multiple of a number of classes.

11. The apparatus of claim 10, wherein a number of weights for each corresponding weight set of each level corresponds to the third number of queues.

12. The apparatus of claim 9, wherein a data unit for a queue is dropped if a number of data units exceeds the buffer threshold for the queue, a dropped data unit may be a data unit already queued in the queue or a data unit to be queued in the queue.

* * * * *